(12) United States Patent
Kim et al.

(10) Patent No.: US 10,735,757 B2
(45) Date of Patent: Aug. 4, 2020

(54) VIDEO DECODER AND CONTROLLING METHOD THEREOF

(71) Applicants: LG ELECTRONICS INC., Seoul (KR); KWANGWOON UNIVERSITY INDUSTRY-ACADEMIC COLLABORATION FOUNDATION, Seoul (KR)

(72) Inventors: Kyungyong Kim, Seoul (KR); Donggyu Sim, Seoul (KR); Hongsuk Jeong, Seoul (KR); Seungchul Jang, Seoul (KR); Seanae Park, Seoul (KR); Juntaek Park, Seoul (KR)

(73) Assignees: LG ELECTRONICS INC., Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 170 days.

(21) Appl. No.: 15/884,240

(22) Filed: Jan. 30, 2018

(65) Prior Publication Data
US 2019/0238873 A1 Aug. 1, 2019

(51) Int. Cl.
*H04N 19/44* (2014.01)
*H04N 19/124* (2014.01)
*H04N 19/176* (2014.01)
*H04N 19/593* (2014.01)
*H04N 19/91* (2014.01)

(52) U.S. Cl.
CPC .......... *H04N 19/44* (2014.11); *H04N 19/124* (2014.11); *H04N 19/176* (2014.11); *H04N 19/593* (2014.11); *H04N 19/91* (2014.11)

(58) Field of Classification Search
CPC .... H04N 19/124; H04N 19/176; H04N 19/44; H04N 19/593; H04N 19/91
USPC .................................................. 375/240.12
See application file for complete search history.

(56) References Cited

U.S. PATENT DOCUMENTS

| | | | |
|---|---|---|---|
| 2010/0166070 A1* | 7/2010 | Goel | H04N 19/176 375/240.15 |
| 2011/0134999 A1* | 6/2011 | Han | H04N 19/176 375/240.12 |
| 2011/0286516 A1* | 11/2011 | Lim | H04N 7/17318 375/240.03 |
| 2013/0016774 A1 | 1/2013 | Oh | |
| 2014/0140410 A1 | 5/2014 | Zhang et al. | |
| 2014/0152767 A1 | 6/2014 | Pometun et al. | |
| 2016/0065981 A1* | 3/2016 | Wee | H04N 19/44 382/233 |
| 2016/0142716 A1 | 5/2016 | Li et al. | |
| 2019/0158846 A1* | 5/2019 | Moon | H04N 19/14 |

OTHER PUBLICATIONS

PCT International Application No. PCT/KR2018/001112, Notification of Transmittal of the International Search Report and the Written Opinion of the International Searching Authority, or Declaration dated Oct. 19, 2018, 14 pages.

* cited by examiner

*Primary Examiner* — James T Boylan
(74) *Attorney, Agent, or Firm* — Lee, Hong, Degerman, Kang & Waimey

(57) ABSTRACT

The present invention relates to a video decoder and controlling method thereof. Particularly, the present invention is characterized in dividing a block into subblocks of a prescribed unit, selecting prescribed subblocks according to a priority, and decoding the selected prescribed subblocks.

10 Claims, 9 Drawing Sheets

VIDEO DECODER AND CONTROLLING METHOD THEREOF

BACKGROUND OF THE INVENTION

Field of the Invention

The present invention relates to a video decoder, and more particularly, to a video decoder and controlling method thereof. Although the present invention is suitable for a wide scope of applications, it is particularly suitable for reducing an operation quantity by selecting prescribed subblocks from a transform block only and then decoding the selected subblocks only.

Discussion of the Related Art

Recently, owing to the appearance of various smart devices, the market's demands for high-resolution video and high-definition video are rapidly increasing. Complexity of decoding for high-resolution video and high-definition video is considerably higher than that of decoding for low-resolution video and low-definition video. Although many studies have been made to reduce complexity, they failed to propose an innovative solution so far.

According to a related art, when a thumbnail image is extracted from a video bit stream, a method of extracting a DC value only is used.

As a method for efficiently coding an ultra-high-definition (UHD) video content efficiently, high efficiency video coding (HEVC) video codec is popularly used.

SUMMARY OF THE INVENTION

However, if resolution is very high like UHD image, errors generated from extracting DC values are accumulated gradually. Thus, the following problems are caused. First of all, an image is distorted at an end portion of the image so as not to be distinguished by a user. Secondly, decoding cannot be performed normally.

Accordingly, the present invention is directed to a video decoder and controlling method thereof that substantially obviate one or more of the problems due to limitations and disadvantages of the related art.

An object of the present invention is to provide a video decoder and controlling method thereof, which can reduce an operation quantity by decoding a specific partial block only instead of a whole block in performing video decoding.

Another object of the present invention is to provide a video decoder and controlling method thereof, which can reduce an operation quantity, if the number of coefficients within a subblock is equal to or greater than a preset reference value in performing video decoding, by decoding the corresponding subblock only.

Further object of the present invention is to provide a video decoder and controlling method thereof, which can reduce an operation quantity, if a location value of a quantization coefficient in a current subblock is equal to or smaller than a half of a current transform block size, by performing dequantization on the current subblock.

Another further object of the present invention is to provide a video decoder and controlling method thereof, which can reduce an operation quantity, if a current transform block size is equal to or greater than a first block size, by performing inverse transform based on a corresponding subblock to be decoded in a current block and then performing linear interpolation on the inverse-transformed corresponding subblock.

Technical tasks obtainable from the present invention are non-limited by the above-mentioned technical tasks. And, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a video decoder according to one embodiment of the present invention includes a reconstruction signal selecting unit selecting a signal to be reconstructed for a bitstream, an entropy decoding unit obtaining a quantization coefficient of at least one block unit by entropy-decoding the selected signal to be reconstructed, a dequantization unit obtaining a transform coefficient through dequantization performed on the obtained quantization coefficient of the at least one block unit, an inverse transform unit obtaining a residual signal through inverse transform using a specific transform base suitable for a block size of the obtained transform coefficient, an intra picture prediction unit obtaining a predicted signal by referring to reference samples for a current block to be decoded, a residual signal compensating unit scaling a block of the obtained residual signal based on a block size of the predicted signal, and an adding-up unit generating a reconstructed signal by adding the scaled residual signal and the predicted signal together.

To further achieve these and other advantages and in accordance with the purpose of the present invention, as embodied and broadly described, a method of decoding a video in a device according to another embodiment of the present invention includes selecting a signal to be reconstructed for a bitstream, obtaining a quantization coefficient of at least one block unit by entropy-decoding the selected signal to be reconstructed, if a preset condition is met, dequantizing specific partial blocks, and outputting a decoded video based on a result from dequantizing the partial block, wherein the preset condition is determined according to at least one selected from the group consisting of a chroma signal, a size of a transform block, and a location value of a coefficient.

It is to be understood that both the foregoing general description and the following detailed description are exemplary and explanatory and are intended to provide further explanation of the invention as claimed.

According to one embodiment of the present invention, by decoding specific partial blocks only instead of a whole block in performing video decoding, an operation quantity can be reduced and a video decoding execution speed can be improved, whereby user convenience is enhanced. Decoding used in the present specification may be performed in order reverse to that of an encoding process.

According to another embodiment of the present invention, if the number of coefficients within a subblock is equal to or greater than a preset reference value in performing video decoding, an operation quantity can be reduced by decoding the corresponding subblock only and a video decoding execution speed can be improved, whereby user convenience can be enhanced.

According to further embodiment of the present invention, if a location value of a quantization coefficient in a current subblock is equal to or smaller than a half of a current transform block size, an operation quantity can be reduced by performing dequantization on the current subblock and a video decoding execution speed can be improved, whereby user convenience can be enhanced.

According to another further embodiment of the present invention, if a current transform block size is equal to or greater than a first block size, an operation quantity can be reduced by performing inverse transform based on a corresponding subblock to be decoded in a current block and then performing linear interpolation on the inverse-transformed corresponding subblock and a video decoding execution speed can be improved, whereby user convenience can be enhanced.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings, to facilitate those having ordinary skill in the art to implement the invention. Wherever possible, the same reference numbers will be used throughout the drawings to refer to the same or like parts. Terminologies 'module' and 'unit' for components used in the following description are interchangeably usable in consideration of the facilitation for the specification writing but do not have distinctive meanings or roles.

In describing embodiments disclosed in the present specification, if the details of the related art are determined as obscuring the gist of the embodiments disclosed in the present specification, the corresponding detailed description shall be omitted.

The accompanying drawings are included to provide a further understanding of the invention, are incorporated in and constitute a part of this specification, and illustrate embodiments of the invention and together with the description serve to explain the principles of the invention. And, the accompanying drawings should be understood as including various modifications and variations of the invention that come within the scope of the appended claims and their equivalents.

Terminologies including ordinal numbers such as first, second and the like may be used to describe various components, by which the components may be non-limited. And, the terminologies are used for the purpose of discriminating one component from other components only.

If one component is mentioned as 'connected to' or 'accessing' another component, the former component may be connected to accesses the latter component in direct. Yet, it is understood that a different component may be present in-between. On the other hand, if one component is mentioned as 'directly connected to' or 'directly accessing' another component, it is understood that a different component may is not present in-between.

Singular expression may include plural expressions unless having a clear meaning in the context.

In the present application, such a terminology as 'include', 'have' and the like intends to designate that a feature, a number, a step, an operation, a component, a part or a combination thereof disclosed in the specification exists and should be understood as not excluding possibility of existence or addition of at least one or more features, numbers, steps, operations, components, parts or combinations thereof.

Figure 1:
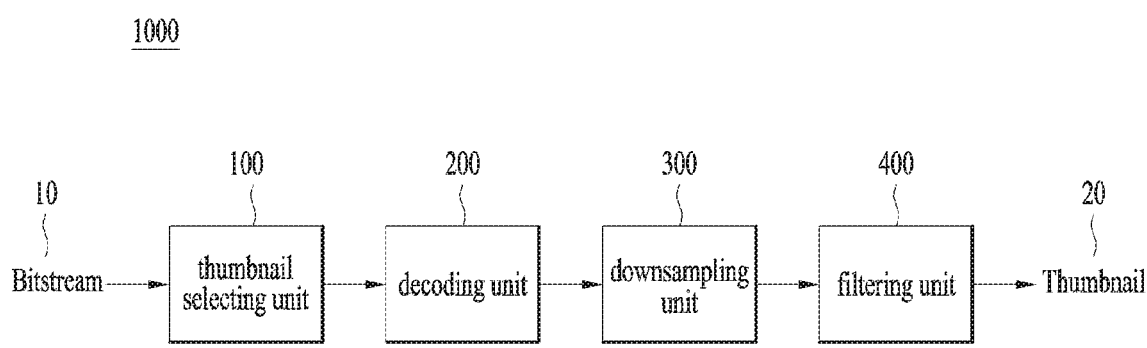
FIG. 1 is a schematic diagram showing an overall configuration of a device according to one embodiment of the present invention.

FIG. 1 is a schematic diagram showing an overall configuration of a device according to one embodiment of the present invention.

A device 1000 shown in FIG. 1 may include any device capable of performing video decoding and refer to a video thumbnail extractor in pursuit of study if focused on functions in the present specification.

Referring to FIG. 1, the device 1000 may include a thumbnail selecting unit 100, a decoding unit 200, a downsampling unit 300 and a filtering unit 400.

The thumbnail selecting unit 100 selects an image to be outputted as a thumbnail in a whole video from an input bitstream 10.

The decoding unit 200 decodes the image selected by the thumbnail selecting unit 100.

The downsampling unit 300 reduces a size of the decoded image into a size of a thumbnail to be used.

And, the filtering unit 400 filters the reduced image for image quality enhancement and outputs the filtered image as a thumbnail 20.

Figure 2:
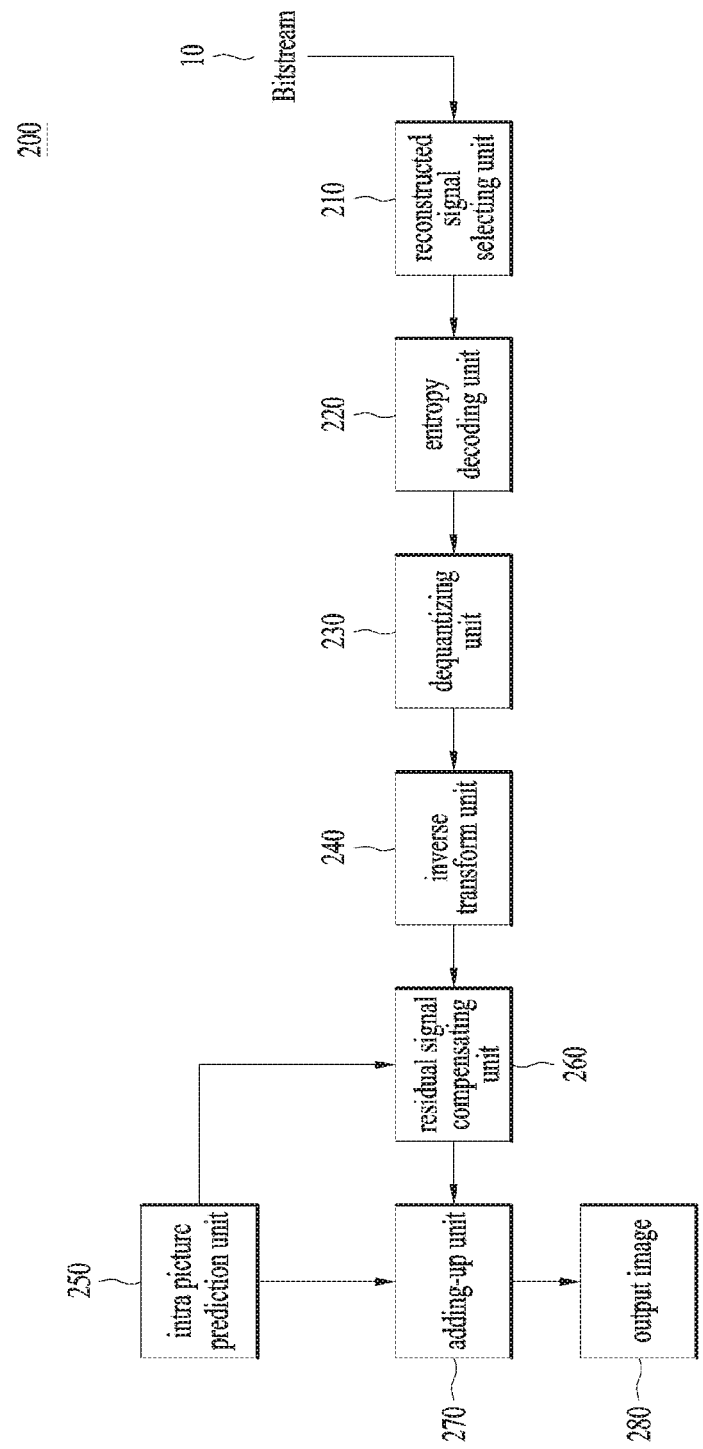
FIG. 2 is a diagram showing details of prescribed components shown in FIG. 1 according to one embodiment of the present invention.

FIG. 2 is a diagram showing details of prescribed components shown in FIG. 1 according to one embodiment of the present invention. Particularly, although the functions performed by the decoding unit 200 shown in FIG. 1 are illustrated as the respective modules in FIG. 2, merging to design prescribed modules into a single module pertains to the scope of a right of the present invention.

Referring to FIG. 2, the decoding unit 200 includes a reconstruction signal selecting unit 210, an entropy decoding unit 220, a dequantization unit 230, an inverse transform unit 240, an intra picture prediction unit 250, a residual signal compensating unit 260, an adding-up unit 270 and the like.

The reconstruction signal selecting unit 210 determines a signal to be reconstructed through a size ratio of an image size of an inputted bitstream 10 to a size of a thumbnail to be generated, a signal to be reconstructed, an amount of information of the signal to be reconstructed, and a block size of the signal to be reconstructed.

The entropy decoding unit 220 outputs at least one of a syntax element and a quantized coefficient to be reconstructed by decoding a signal to be determined as the signal to be reconstructed in an inputted bitstream 10. The outputted information may be named decoding information.

The entropy decoding unit 220 is designed to vary a block size of the quantization coefficient obtained according to a transform block size of the selected signal to be reconstructed.

For example, if a transform block size of a signal to be reconstructed is 16×16 block, a block size of the quantization coefficient to be obtained may become 8×8 block. Moreover, if a transform block size of a signal to be reconstructed is 32×32 block, a block size of the quantization coefficient to be obtained may become 16×16 block. Of course, the scope of the right of the present invention is not determined by the above numerical values only. And, changing the numerical values in part to meet the necessity of those skilled in the art pertains to the scope of the right of the present invention.

The dequantization unit 230 receives the partially quantized coefficient to be reconstructed from the entropy decoding unit 220, performs dequantization, and outputs a transform coefficient.

The inverse transform unit 240 outputs the residual signal as a result from receiving the partially transform coefficient to be reconstructed and then performing inverse transform using a portion of a transform base only.

The intra picture prediction unit 250 generates a predicted signal by performing spatial prediction based on a pixel value of a previously decoded neighbor block adjacent to a current block to be decoded, i.e., a reference sample. Here, the reference sample means a previously encoded or decoded sample within a current frame. Furthermore, those skilled in the art, to which the present embodiment pertains, can understand that an image, a frame, a picture and the like has the same or equivalent meaning in the present specification.

Since there is a difference between a block size of a residual signal and a block size of a predicted signal, the residual signal compensating unit 260 scales the block size of the residual signal based on the block size of the predicted signal. Namely, the residual signal compensating unit 260 scales the block size of the residual signal so that the block size of the residual signal and the block size of the predicted signal are made to become equal to each other.

The adding-up unit 270 generates a reconstructed signal by a block unit in a manner of adding the predicted signal and the scaled residual signal together. The reconstructed signal contains a reconstructed image.

For example, if a block size of a predicted signal is 16×16 block and a block size of a residual signal is 8×8 block, a block of the residual signal is scaled into 16×16 block based on the block size of the predicted signal and the adding-up unit 270 generates a reconstructed signal by 16×16 block unit in a manner of adding the predicted signal and the scaled residual signal together.

Furthermore, the elements described in FIGS. 1 and 2 are included in a video processor, a CPU (central processing unit), graphics processor or any controller.

Figure 3:
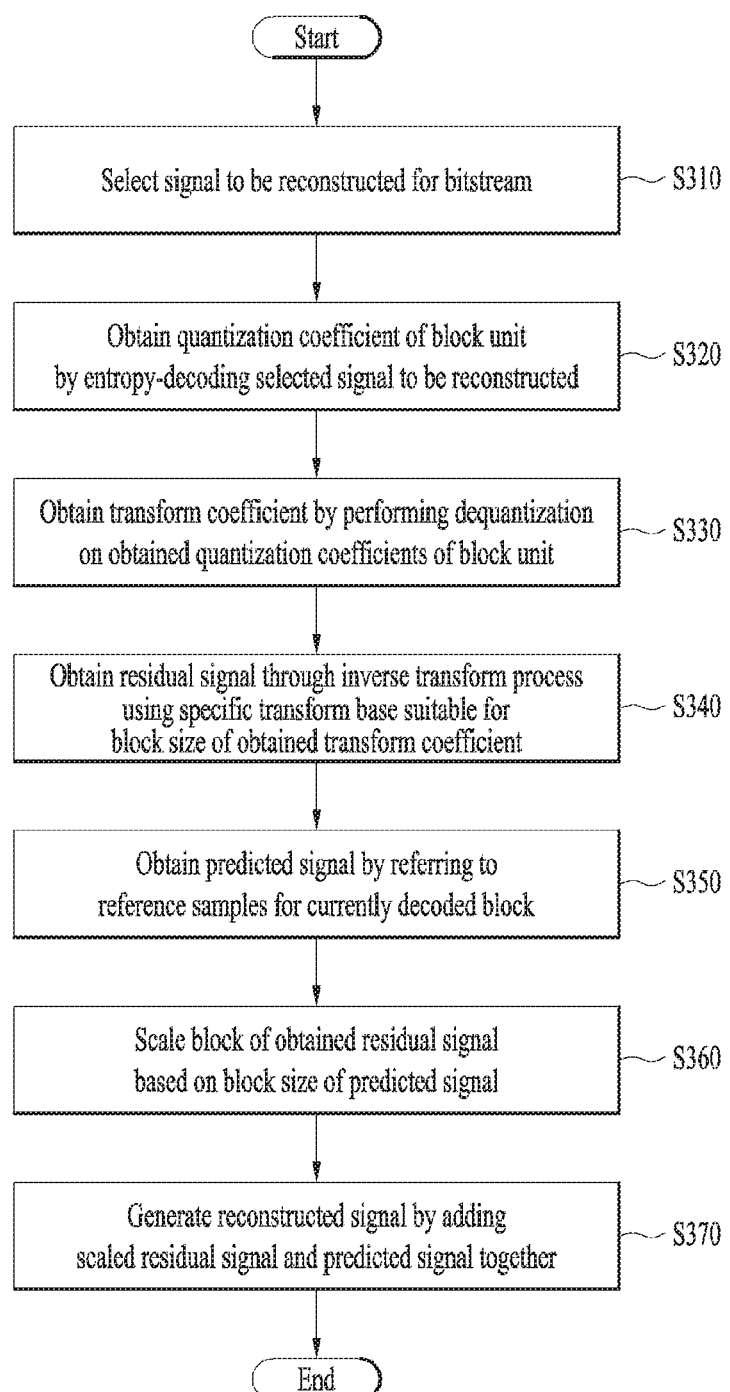
FIG. 3 is a flowchart for a method of controlling a video decoder according to one embodiment of the present invention.

FIG. 3 is a flowchart for a method of controlling a video decoder according to one embodiment of the present invention.

Referring to FIG. 3, first of all, the reconstruction signal selecting unit 210 selects a signal to be reconstructed for a bitstream [S310].

The entropy decoding unit 220 obtains a quantization coefficient of a block unit by entropy-decoding the selected signal to be reconstructed [S320].

Subsequently, the dequantization unit 230 obtains a transform coefficient by performing dequantization on the obtained quantization coefficients of the block unit [S330].

The inverse transform unit 240 obtains a residual signal through an inverse transform process using a specific transform base suitable for a block size of the obtained transform coefficient [S340].

The intra picture prediction unit 250 obtains a predicted signal by referring to reference samples for a current block to be decoded [S350].

The residual signal compensating unit 260 scales a block of the obtained residual signal to become equal to a block size of the predicted signal based on the block size of the predicted signal [S360].

And, the adding-up unit 270 generates a reconstructed signal by block unit in a manner of adding the scaled residual signal and the predicted signal together [S370].

In summary, the technical feature of one embodiment of the present invention includes a method of reducing or reinforcing a decoding step selectively within a minimum error range.

For one example, after dividing 32×32 transform block into 64 subblocks of 4×4 unit, prescribed subblocks among the 64 subblocks can be selectively decoded according to priority only. For another example, 16 subblocks close to a DC value among the 64 subblocks can be decoded only.

Dequantization and inverse transform may be performed on prescribed subblocks in two ways as follows.

Firstly, if prescribed subblocks in 32×32 transform block are decoded, it means that the prescribed subblocks are dequantized only and that a random value is substituted without performing dequantization on the rest of subblocks. Here, the random value may include 0. Yet, the random value may be limited to other numerical values, which pertains to the scope of the right of the present invention.

Therefore, although the prescribed subblocks are dequantized only, an output image decoded in the inverse transform process can become a reconstructed block in 32×32 size after experiencing inverse transform by 32×32 unit that is a size of the preset transform block.

Secondly, if prescribed subblocks in 32×32 transform block are decoded, it means that the prescribed subblocks are dequantized and inverse-transformed only. Therefore, since the prescribed subblocks are dequantized and inverse-transformed only, a size of a decoded output image can become a size of the prescribed blocks.

For example, 16 prescribed subblocks in 32×32 transform block can be dequantized and inverse-transformed. In this case, a decoded output image can become a reconstructed block in 16×16 size configured with the 16 prescribed subblocks. Therefore, since it is not necessary to maintain a memory for the whole 32×32 block, it is efficient in aspects of memory and calculation amount.

Figure 4:
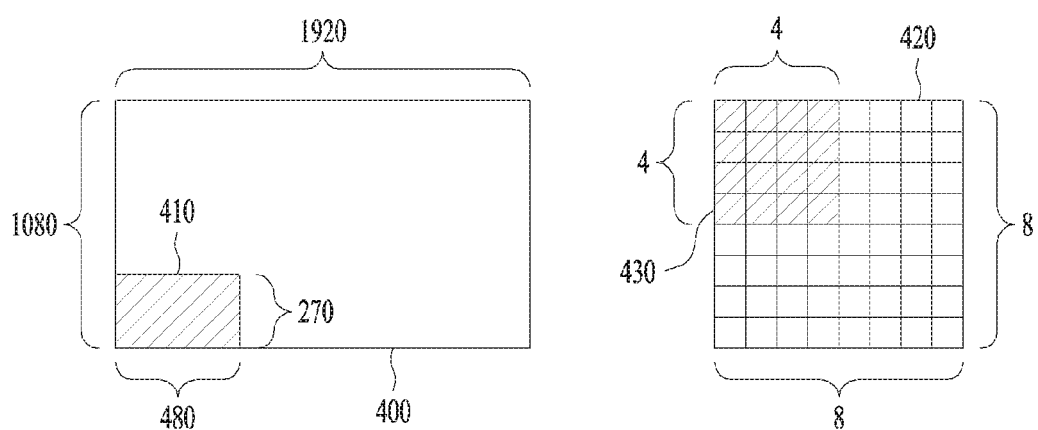
FIG. 4 is a diagram showing an embodiment of a method for selecting a signal to be reconstructed in a reconstruction signal selecting unit 210 shown in FIG. 2.

FIG. 4 is a diagram showing an embodiment of a method for selecting a signal to be reconstructed in the reconstruction signal selecting unit 210 shown in FIG. 2.

Referring to FIG. 4, an image size 400 of an inputted bitstream is 1920×1080, and a size 410 of a thumbnail to be created is 480×270.

A ratio of the two images is 16:1, and a relative ratio of a block size of a reconstructed signal to a block size of an input signal can be determined as 1:4 for the thumbnail creation.

For another embodiment, if a relative ratio of a block size of a reconstructed signal to a block size of an input signal can be determined as 1:4, a 4×4 quantization coefficient block 430 including DC frequency information and low frequency information in an inputted 8×8 quantization coefficient block 420 is decoded and reconstructed. Furthermore, the DC frequency information and the low frequency information are assumed as containing important substance of image information required for a video decoding process for example.

Figure 5:
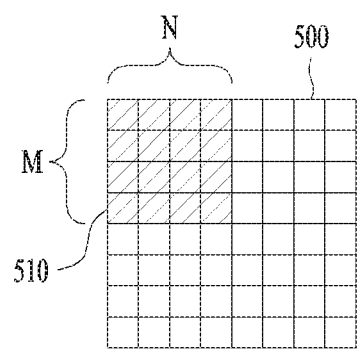
FIG. 5 is an emphasized diagram showing a partial block of a signal processed by an entropy decoding unit 220, a dequantization unit 230 and an inverse transform unit 240 according to one embodiment of the present invention.

FIG. 5 is an emphasized diagram showing a partial block of a signal processed by the entropy decoding unit 220, the dequantization unit 230 and the inverse transform unit 240 according to one embodiment of the present invention.

Referring to FIG. 5, a prescribed block of a signal used by the entropy decoding unit 220, the dequantization unit 230 and the inverse transform unit 240 is a block 510 including DC frequency information and low frequency information in N×M size corresponding to a portion of a transform coefficient block 500.

For example, when N and M are 4 and 4, respectively, if the transform coefficient block 500 is 8×8 block, a prescribed block of a signal may become 4×4 block.

Figure 6:
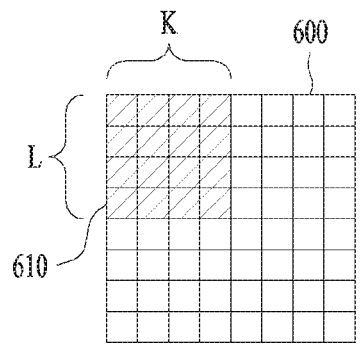
FIG. 6 is a diagram to describe a transform base processed by an inverse transform unit 240 according to one embodiment of the present invention.

FIG. 6 is a diagram to describe a transform base processed by the inverse transform unit 240 according to one embodiment of the present invention.

Referring to FIG. 6, a transform base used by the inverse transform unit 240 is a transform base required for reconstructing a portion of a signal used by the entropy decoding unit 220, the dequantization unit 230 and the inverse transform unit 240, and is a block 510 including a DC frequency base and a low frequency base as K×L transform base block 610, which corresponds to a partial block of a transform base block 600 required for reconstructing all transform coefficient signals.

For example, when K and L are 4 and 4, respectively, if the transform base block 600 is 8×8 block, the transform base partial block 610 may become 4×4 block.

Figure 7:
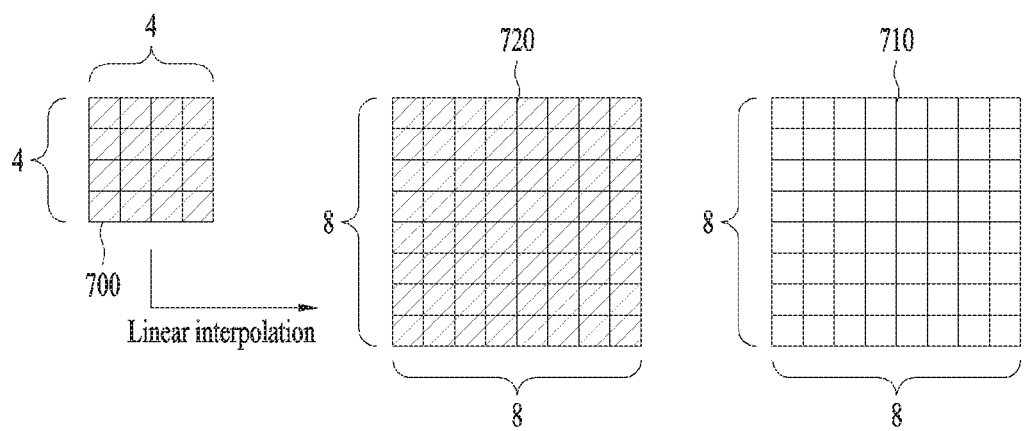
FIG. 7 is a diagram to describe a scaling process of a residual signal compensating unit 260 according to one embodiment of the present invention.

FIG. 7 is a diagram to describe a scaling process of a residual signal compensating unit 260 according to one embodiment of the present invention.

Referring to FIG. 7, in order to make a block size of a residual signal 700 become equal to a block size of a predicted signal 710, the residual signal compensating unit 260 outputs a scaled residual signal 720 by scaling the received residual signal 700 by linear interpolation.

For example, if a block size of the received residual signal 700 is 4×4 and a block size of the predicted signal 710 is 8×8, the residual signal compensating unit 260 scales the block size of the residual signal 700 to twice in width and twice in length by linear interpolation. The block size of the residual signal 720 is scaled to be equal to that of the predicted signal 710 and then outputted.

Figure 8:
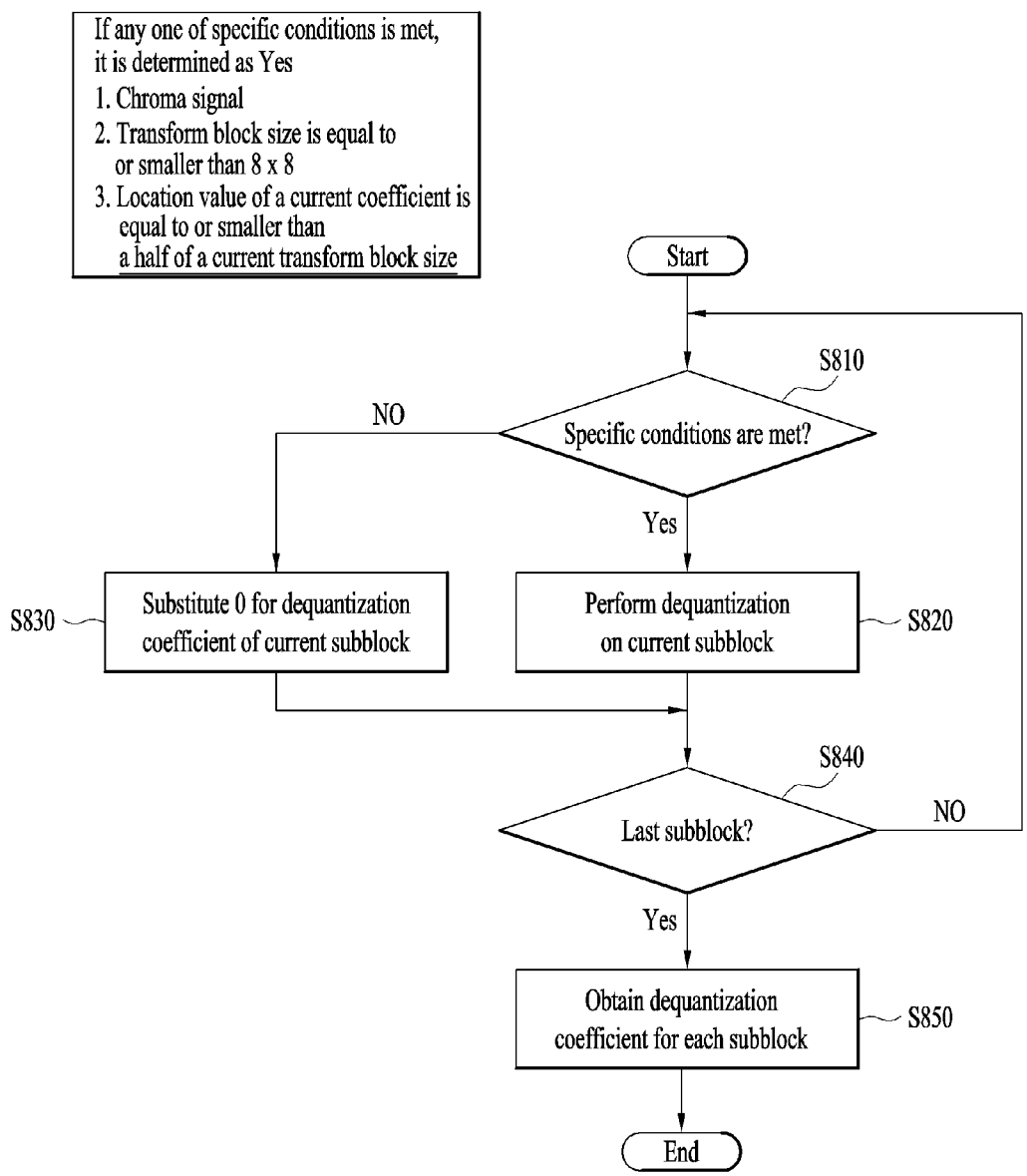
FIG. 8 is a flowchart for selectively performing dequantization according to one embodiment of the present invention.

FIG. 8 is a flowchart for selectively performing dequantization according to one embodiment of the present invention.

Referring to FIG. 8, a method of selectively performing dequantization may be performed based on various embodiments and conditions as follows.

First of all, according to one embodiment of the present invention, the method can selectively apply for a random block size. In particular, for example, the method applies to 32×32 block size only or is applicable to sizes smaller or greater than the 32×32 block size.

Secondly, according to another embodiment of the present invention, the method is applicable to at least one of a luminance signal and a chroma signal Cb and Cr. According to further embodiment of the present invention, the method is applicable to at least one of red (R), green (G) and blue (B) signals.

Finally, a method newly proposed by the present invention may be selectively applicable deepening on depth of a coding block (CB).

According to one embodiment of the present invention, source code in ffmpeg (https://www.ffmpeg.org/), which is media framework open source, can be implemented by being modified as follows. First of all, a process for the entropy decoding unit 220 to select a block to be decoded from random block unit quantization coefficients can be implemented by modifying a 'ff_hevc_hls_residual_coding' function within "libavcodec/hevc_cabac.c" source as follows.

```
1448 #if HEVC_IDCT_DOWN
1449     //quantization removal of unnecessary coefficient
1450     if((y_c<(trafo_size>>1) && x_c<(trafo_size>>1))
         || trafo_size<16 || c_idx)
1451     {
1452 #endif
1453         if(!lc->cu.cu_transquant_bypass_flag) {
1454             if (s->ps.sps->scaling_list_enable_flag &&
                 !(transform_skip_flag && log2_trafo_size > 2)) {
1455                 if(y_c || x_c || log2_trafo_size < 4) {
1456                     switch(log2_trafo_size) {
1457                         case 3: pos = (y_c << 3) + x_c; break;
1458                         case 4: pos = ((y_c >> 1) <<3) +
                                 (x_c >> 1); break;
1459                         case 5: pos = ((y_c >> 2) <<3) +
                                 (x_c >> 2); break;
1460                         default: pos = (y_c << 2) + x_c; break;
1461                     }
1462                     scale_m = scale_matrix[pos];
1463                 } else {
1464                     scale_m = dc_scale;
1465                 }
1466             }
1467             trans_coeff_level = (trans_coeff_level *
                 (int64_t)scale * (int64_t)scale_m + add) >> shift;
1468             if(trans_coeff_level < 0) {
1469                 if((~trans_coeff_level) & 0xFffffffff8000)
1470                     trans_coeff_level = -32768;
1471             } else {
1472                 if(trans_coeff_level & 0xffffffffff8000)
1473                     trans_coeff_level = 32767;
1474             }
1475         }
1476 #if HEVC_IDCT_DOWN
1477         if(trafo_size>=16 && !c_idx)
```

-continued

```
1478            coeffs[y_c * (trafo_size>>1) +
                  x_c] = trans_coeff_level;
1479          else
1480            coeffs[y_c * trafo_size + x_c] = trans_coeff_level;
1481          }
1482 #else
1483          coeffs[y_c * trafo_size + x_c] = trans_coeff_level;
1484 #endif
```

The above source code control logic is described as follows.

Referring to FIG. 8, it is checked whether specific conditions are met [S810]. If any one of the specific conditions is met, it is determined as Yes. Here, the specific conditions correspond to a case 1) of a chroma signal, a case 2) that a transform block size is equal to or smaller than 8×8, and a case 3) that a location value of a current coefficient is equal to or smaller than a half of a current transform block size.

If specific conditions are met, it means that a current subblock contains high priority information of a whole block and that a sufficiently identifiable image can be reconstructed by dequantizing the current subblock.

The first condition (i.e., chroma signal) is described as follows. First of all, a chroma signal means a signal having chroma information only without having information on brightness and also means a signal excluding luminance signal (Y) information from each color signal (R, G, B). Here, a luminance signal means a signal that represents video image brightness as voltage waveform.

Compared to a luminance signal, a chroma signal has a relatively small information size. Although the present invention applies to a chroma signal, an effect of reducing an operation quantity is insignificant. Hence, dequantization is applied to a chroma signal like the existing method.

The second condition (i.e., transform block size) is described as follows. First of all, if a size of a transform block is equal to or smaller than 8×8, since high priority information is contained, dequantization is applied like the existing method. On the other hand, if a size of a transform block is greater than 8×8, prescribed subblocks are dequantized through the third condition (i.e., coefficient value) only.

The third condition (i.e., coefficient value) shall be described in detail with reference to FIG. 9 later.

If one of the above 3 conditions is met, the dequantization unit 230 performs dequantization on the current subblock [S820].

If the specific condition is not met, the dequantization unit 230 substitutes 0 for a dequantization coefficient of the current subblock [S830].

It is checked whether the current subblock is a last subblock [S840].

If the current subblock is the last subblock, a dequantization coefficient for each subblock is obtained [S850].

If the current subblock is not the last subblock, the routine goes to the step S810 of checking whether the specific condition is met.

Figure 9:
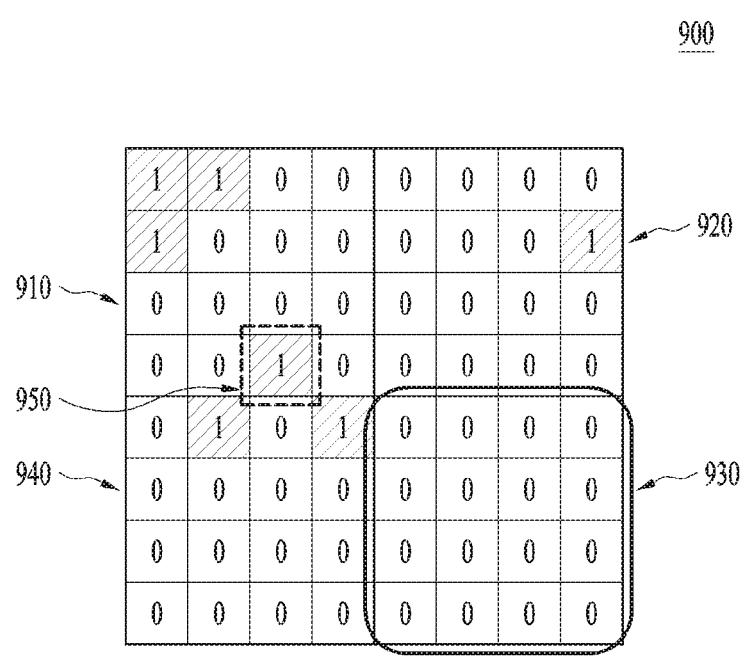
FIG. 9 is a diagram showing an example of 8×8 subblock according to one embodiment of the present invention.

FIG. 9 is a diagram showing an example of 8×8 subblock according to one embodiment of the present invention.

The present invention has the technical effect on a method of decoding a prescribed subblock only. And, a method of selecting a subblock to decode is described as follows.

First of all, 8×8 block includes 4 4×4 subblocks. The 8×8 block 900 includes a first subblock 910, a second subblock 920, a third subblock 930 and a fourth subblock 940.

If the number of coefficients within each subblock is equal to or greater than or a preset reference value, it is able to decode the corresponding subblock. Subblocks failing to meet the corresponding condition may be substituted with a random value without being decoded. For example, the random value may include 0.

For example, referring to FIG. 9, the number of coefficients of the first subblock 910 is 4, the number of coefficients of the second subblock 920 is 1, the number of coefficients of the third subblock 930 is 0, and the number of coefficients of the fourth subblock 940 is 2. If a preset reference value is 3, the first subblock 910 meets the corresponding condition only, whereas the second to fourth subblocks 920, 930 and 940 fail to meet the corresponding condition.

Therefore, the entropy decoding unit 220 decodes the first subblock 910 only and substitutes the rest of the subblocks, i.e., the second to fourth subblocks 920, 930 and 940 with 0 without decoding the second to fourth subblocks 920, 930 and 940.

Moreover, through a significant_coeff_flag value in HEVC standard, the number of coefficients within each subblock can be inferred.

In the following, described in detail is the third specific condition shown in FIG. 8, i.e., a case that a location value of a current coefficient is equal to or smaller than a half of a current transform block size.

Referring to FIG. 9, the current transform block 900 is 8×8 block that includes the first to fourth subblocks 910, 920, 930 and 940.

For example, if a location value 950 of a current quantization coefficient is (2, 3) in x-y coordinates, the location value 950 of the current quantization coefficient is included in 4×4 block corresponding to a half of 8×8 block corresponding to a current transform block size. Here, '1' means that a coefficient exists.

Namely, a current subblock becomes the first subblock 910. Hence, the dequantization unit 230 selects the first subblock 910 only, performs dequantization on the first subblock 910, and substitutes the rest of the subblocks, i.e., the second to fourth subblocks 920, 930 and 940 with 0 instead of performing dequantization thereon.

Figure 10:
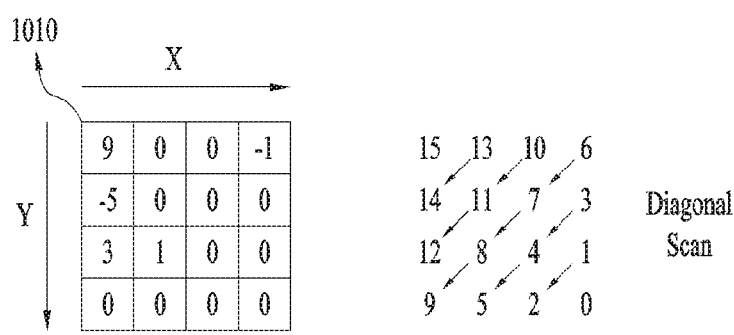
FIG. 10 is a diagram showing an example of 4×4 transform block in HEVC standard according to one embodiment of the present invention.
Figure 10:
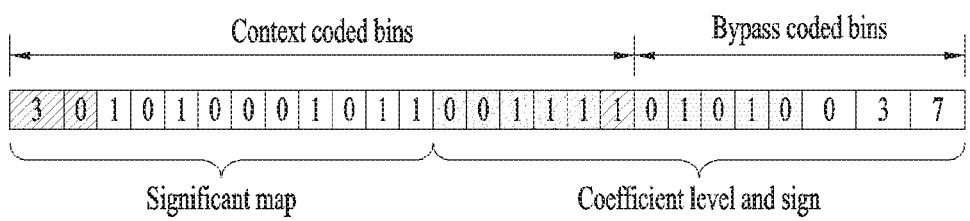

FIG. 10 is a diagram showing an example of 4×4 transform block in HEVC standard according to one embodiment of the present invention.

Referring to FIG. 10, a 4×4 transform block 1010 includes coefficients of 9, −1, −5, 3, and 1. Here, the number of coefficients is 5.

If a significant_coeff_flag value 1020 is checked, since the number of 1 is 5, it can be observed that the number of coefficients is 5. Here, '1' indicates that a coefficient exists. If a coefficient exists, a significant_coeff_flag value becomes 1. If a coefficient does not exist, a significant_coeff_flag value becomes 0.

If at least one absolute value among values of coefficients in each subblock is equal to or greater than or equal to or smaller than a preset reference value, the entropy decoding unit 220 can decode a corresponding subblock.

Subblocks failing to meet the corresponding condition can be substituted with a random value instead of being decoded. Here, the random value may include 0.

For example, referring to FIG. 10, 4×4 transform block 1010 includes coefficients of 9, −1, −5, 3, and 1. If a reference value is 2, regarding 9, −5, and 3 among the coefficients, an absolute value of a corresponding coefficient becomes equal to or greater than the reference value. And, the entropy decoding unit 220 can decode the 4×4 transform block 1010.

Moreover, in HEVC standard, through values of coeff_abs_level_greater1_flag, oeff_abs_level_greater2_flag, and coeff_abs_level_remaining, it is able to infer the value of coefficients in each subblock.

For example, it can be observed that the number of coefficients greater than 1 in coeff_abs_level_greater1_flag is 3. Moreover, a single coeff_abs_level_greater2_flag exists per subblock to the maximum. In scan order, coeff_abs_level_greater2_flag means a diagonal scan in FIG. 10. And, it is able to know a location of a coefficient greater than 2 that appears first. Hence, through coeff_abs_level_greater1_flag and coeff_abs_level_greater2_flag, it is able to derive a basic value (3, 2, 2) of coefficients greater than 1. And, it can be observed that (3, 5, 9) can be derived by adding the basic value (3, 2, 2) of the coefficients greater than 1 derived through coeff_abs_level_greater1_flag and coeff_abs_level_greater2_flag and the coeff_abs_level_remaining value (0, 3, 7) together.

Hence, if a reference value is 2, the absolute value of coefficients in each subblock can be inferred as 9, 5, 3.

Subsequently, through a case that a location of a last coefficient within a transform block including subblocks exists in a section randomly determined according to a scan order shown in FIG. 10, it is able to determine whether each subblock is decoded.

According to one embodiment of the present invention, through values of "last_sig_coeff_x" and "last_sig_coeff_y" in HEVC standard, it is able to check a location of a last coefficient within a transform block.

Referring to FIG. 10, for example, if a diagonal scan order is checked, a diagonal scan is performed from a right side to a left side or from a top right end to a bottom left end.

From 4×4 transform block 1010, xy coordinates of a coefficient value is found. In case of '9', the coordinates become (0, 0). In case of '−1', the coordinates become (3, 0). In case of '−5', the coordinates become (0, 1). In case of '3', the coordinates become (0, 2). In case of '1', the coordinates become (1, 2).

When the diagonal scan is performed, the firstly scanned coordinates become (3, 0) corresponding to −1. And, the last scanned coordinates become (0, 0) corresponding to 9.

Hence, through values of last_sig_coeff_x and last_sig_coeff_y, when a location of a last coefficient value within a transform block is checked, the firstly scanned coordinates become a reference.

Hence, since last_sig_coeff_x becomes 3 and last_sig_coeff_y becomes 0, '−1' corresponding to (3, 0) becomes a last coefficient in a transform block. And, if a location of a last coefficient exists at a randomly determined section, e.g., locations of 0, 1, 2, 3, 4, 5, 6, 7, 8, and 9 in the diagonal scan order shown in FIG. 10, it is able to decode a corresponding subblock.

Figure 11:
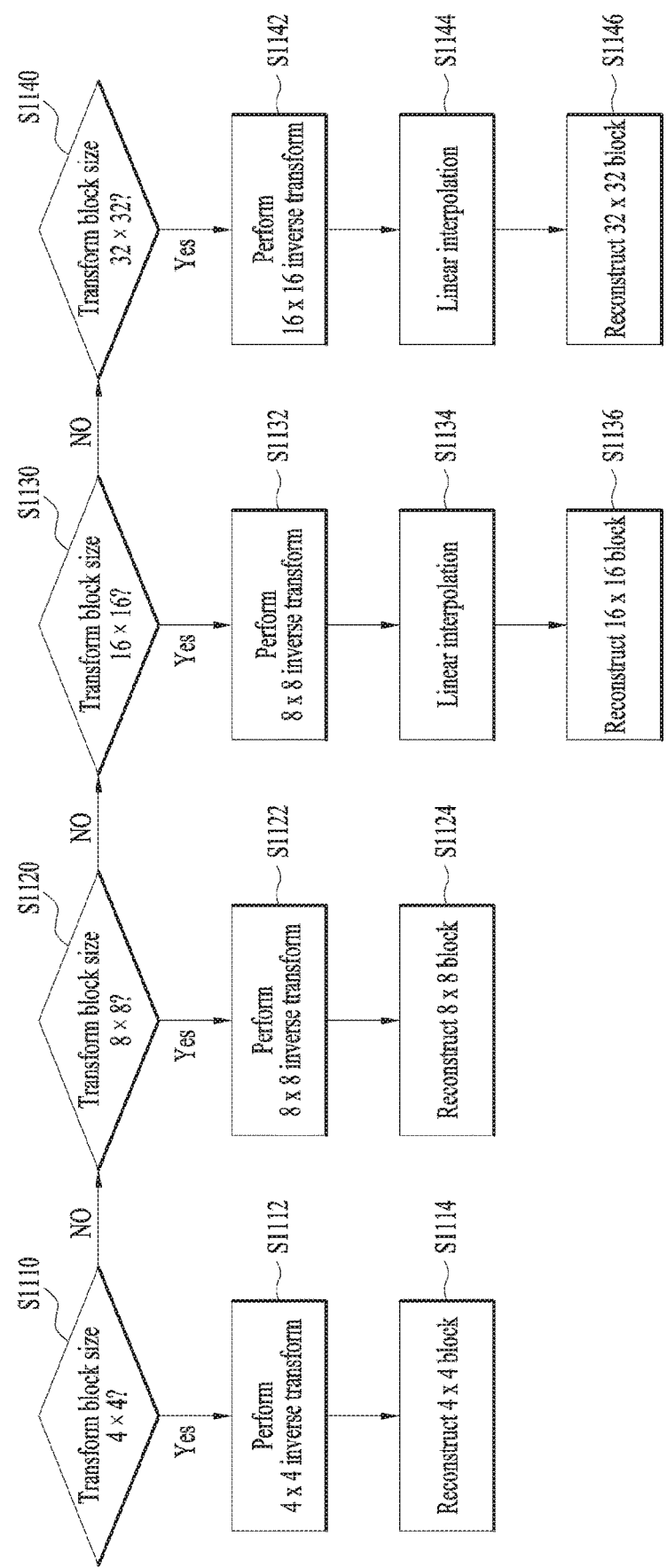
FIG. 11 is a detailed flowchart of a process of an inverse transform unit 240 according to one embodiment of the present invention.

FIG. 11 is a detailed flowchart of a process of the inverse transform unit 240 according to one embodiment of the present invention.

Referring to FIG. 11, a process for obtaining a residual signal in a manner of obtaining a transform coefficient by dequantizing a selected random block unit quantization coefficient in the dequantization unit 230 and performing inverse transform using a specific transform base suitable for a block size of the obtained transform block size in the inverse transform unit 240 can be implemented by modifying the 'ff_hevc_hls_residual_coding' function within the "libavcodec/hevc_cabac.c" source as follows.

```
1532 #if HEVC_IDCT_DOWN
1533         if(c_idx == 0 ){
1534             int max_xy = FFMAX(last_significant_coeff_x, last_significant_coeff_y);
1535             if (max_xy == 0)
1536                 s->hevcdsp.idct_dc_luma[log2_trafo_size - 2](coeffs);
1537             else {
1538                 int col_limit = last_significant_coeff_x + last_significant_coeff_y + 4;
1539                 if (max_xy < 4)
1540                     col_limit = FFMIN(4, col_limit);
1541                 else if (max_xy < 8)
1542                     col_limit = FFMIN(8, col_limit);
1543                 else if (max_xy < 12)
1544                     col_limit = FFMIN(24, col_limit);
1545                 s->hevcdsp.idct_luma[log2_trafo_size - 2](coeffs, col_limit);
1546             }
1547         }
1548         else{
1549 #endif
1550             int max_xy = FFMAX(last_significant_coeff_x, last_significant_coeff_y);
1551             if (max_xy == 0)
1552                 s->hevcdsp.idct_dc[log2_trafo_size - 2](coeffs);
1553             else {
1554                 int col_limit = last_significant_coeff_x + last_significant_coeff_y + 4;
1555                 if (max_xy < 4)
1556                     col_limit = FFMIN(4, col_limit);
1557                 else if (max_xy < 8)
1558                     col_limit = FFMIN(8, col_limit);
1559                 else if (max_xy < 12)
1560                     col_limit = FFMIN(24, col_limit);
1561                 s->hevcdsp.idct[log2_trafo_size - 2](coeffs, col_limit);
1562             }
1563 #if HEVC_IDCT_DOWN
1564         }
1565 #endif
1566     }
1567 }
1568     if (lc->tu.cross_pf) {
```

-continued

```
1569       int16_t *coeffs_y = (int16_t*)lc->edge_emu_buffer;
1570
1571       for (i = 0; i < (trafo_size * trafo_size); i++) {
1572           coeffs[i] = coeffs[i] + ((lc->tu.res_scale_val * coeffs_y[i]) >> 3);
1573       }
1574   }
1575 #if HEVC_IDCT_DOWN
1576       if(c_idx == 0)
1577           s->hevcdsp.add_residual_luma[log2_trafo_size-2](dst, coeffs, stride);
1578       else
1579 #endif
1580           s->hevcdsp.add_residual[log2_trafo_size-2](dst, coeffs, stride);
```

The 'ff_hevcdsp_init_neon' function within the "libavcodec/arm/hevcdsp_init_neon.c" source can be implemented by being modified as follows.

```
45 #if HEVC_IDCT_DOWN
46  void ff_hevc_add_residual_luma_16x16_neon_8(uint8_t *_dst, int16_t *coeffs,
47                      ptrdiff_t stride);
48  void ff_hevc_add_residual_luma_32x32_neon_8(uint8_t *_dst, int16_t *coeffs,
49                      ptrdiff_t stride);
50 #endif
150 av_cold void ff_hevcdsp_init_neon(HEVCDSPContext *c, const int bit_depth)
151 {
152     if (bit_depth == 8) {
153         int x;
154 #if HEVC_IDCT_DOWN
155         c->idct_luma[0]          = ff_hevc_transform_4x4_neon_8;
156         c->idct_luma[1]          = ff_hevc_transform_8x8_neon_8;
157         c->idct_luma[2]          = ff_hevc_transform_8x8_neon_8;
158         c->add_residual_luma[0]  = ff_hevc_add_residual_4x4_neon_8;
159         c->add_residual_luma[1]  = ff_hevc_add_residual_8x8_neon_8;
160         //c->add_residual_luma[2]  = ff_hevc_add_residual_luma_16x16_neon_8;
161         //c->add_residual_luma[3]  = ff_hevc_add_residual_luma_32x32_neon_8;
162         c->idct_dc_luma[0]       = ff_hevc_idct_4x4_dc_neon_8;
163         c->idct_dc_luma[1]       = ff_hevc_idct_8x8_dc_neon_8;
164         c->idct_dc_luma[2]       = ff_hevc_idct_8x8_dc_neon_8;
165         c->idct_dc_luma[3]       = ff_hevc_idct_16x16_dc_neon_8;
166 #endif
```

The "libavcodec/hevcdsp.c" source can be implemented by being modified as follows.

```
245 hevcdsp->idct_luma[0]          = FUNC(idct_4x4, depth);            \
246 hevcdsp->idct_luma[1]          = FUNC(idct_8x8, depth);            \
247 hevcdsp->idct_luma[2]          = FUNC(idct_8x8, depth);            \
248 hevcdsp->idct_luma[3]          = FUNC(idct_16x16, depth);          \
249 hevcdsp->idct_dc_luma[0]       = FUNC(idct_4x4_dc, depth);         \
250 hevcdsp->idct_dc_luma[1]       = FUNC(idct_8x8_dc, depth);         \
251 hevcdsp->idct_dc_luma[2]       = FUNC(idct_8x8_dc, depth);         \
252 hevcdsp->idct_dc_luma[3]       = FUNC(idct_16x16_dc, depth);       \
253 hevcdsp->add_residual_luma[0]  = FUNC(add_residual4x4, depth);     \
254 hevcdsp->add_residual_luma[1]  = FUNC(add_residual8x8, depth);     \
255 hevcdsp->add_residual_luma[2]  = FUNC(add_residual_luma16x16, depth); \
256 hevcdsp->add_residual_luma[3]  = FUNC(add_residual_luma32x32, depth)
```

The "libavcodec/hevcdsp_template.c" source can be implemented by being modified as follows.

```
61 #if HEVC_IDCT_DOWN
62  static av_always_inline void FUNC(add_residual_luma)
       (uint8_t *_dst, int16_t *res,
63                      ptrdiff_t stride, int size)
64  {
65      int x, y;
66      pixel *dst = (pixel *)_dst;
67
68      stride /= sizeof(pixel);
69
70      for (y = 0; y < (size>>1); y++) {
71          for (x = 0; x < size; x+=2) {
72              dst[x] = av_clip_pixel(dst[x] + *res);
73              dst[x+1] = av_clip_pixel(dst[x+1] + *res);
74              res++
75          }
76          res-=(size>>1);
77          dst += stride;
78          for (x = 0; x < size; x+=2) {
79              dst[x] = av_clip_pixel(dst[x] + *res);
```

-continued

```
80      dst[x+1] = av_clip_pixel(dst[x+1] + *res);
81      res++;
82    }
83    dst += stride;
84  }
85 }
86 static void FUNC(add_residual_luma16x16)(uint8_t *_dst,
      int16_t *res,
87                      ptrdiff_t stride)
88 {
89   FUNC(add_residual_luma)(_dst, res, stride, 16);
90 }
91
92 static void FUNC(add_residual_luma32x32)(uint8_t *_dst,
      int16_t *res,
93                      ptrdiff_t stride)
94 {
95   FUNC(add_residual_luma)(_dst, res, stride, 32);
96 }
97 #endif
```

The source code control logic is described as follows.

The proposed method is selectively applicable depending on a size of a transform block. For example, in HEVC, inverse transform can be performed by block units of 4×4, 8×8, 16×16, and 32×32. The proposed method is applicable to a block on which inverse transform of a block unit of 16×16 or 32×32 among 4×4, 8×8, 16×16, and 32×32 is performed only. In case of a block unit of 4×4 or 8×8, all blocks can be decoded.

Referring to FIG. 11, the reconstruction signal selecting unit 210 checks whether a transform block size is 4×4 [S1110].

If the transform block size is 4×4, the inverse transform unit 240 executes 4×4 inverse transform [S1112]. The adding-up unit 270 reconstructs 4×4 block [S1114].

If the transform block size is not 4×4, the reconstruction signal selecting unit 210 checks whether a transform block size is 8×8 [S1120].

If the transform block size is 8×8, the inverse transform unit 240 executes 8×8 inverse transform [S1122]. The adding-up unit 270 reconstructs 8×8 block [S1124].

Namely, if a size of a transform block is 4×4 or 8×8 block unit, all blocks are decoded.

If the transform block size is not 8×8, the reconstruction signal selecting unit 210 checks whether a transform block size is 16×16 [S1130].

If the transform block size is 16×16, the reconstructing signal selecting unit 210 selects 8×8 partial block only according to a priority in the 16×16 transform block. The inverse transform unit 240 performs 8×8 inverse transform on the partial block [S1132]. As the priority is described in detail with reference to FIG. 8, its details are omitted.

The residual signal compensating unit 260 performs linear interpolation, i.e., scaling on the 8×8 block [S1134].

The residual signal compensating unit 260 reconstructs the 8×8 block into 16×16 block [S1136].

If the transform block size is not 16×16, the reconstruction signal selecting unit 210 checks whether a transform block size is 32×32 [S1140].

If the transform block size is 32×32, the reconstruction signal selecting unit 210 selects 16×16 partial block only according to a priority in the 32×32 transform block. The inverse transform unit 240 performs 16×16 inverse transform on the partial block [S1142].

The residual signal compensating unit 260 performs linear interpolation, i.e., scaling on the 16×16 block [S1144].

The residual signal compensating unit 260 reconstructs the 16×16 block into 32×32 block [S1146].

For example, in HEVC, 32×32 transform block is divided into 4 subblocks of 16×16 unit. A random one of the 4 subblocks can be selectively decoded according to a priority.

For another example, a single subblock close to a DC value among the 4 subblocks can be decoded only.

In this case, if a prescribed subblock in the 32×32 transform block is decoded only, it means that the prescribed subblock is dequantized only and that the rest of subblocks are substituted with a random value instead of performing inverse quantization. Here, the random value may include 0.

Hence, although a prescribed subblock is dequantized only, an output image decoded in the inverse transform process may become a reconstructed block in 32×32 size corresponding to a value resulting from performing inverse transform by 32×32 unit.

In this case, if a prescribed subblock in the 32×32 transform block is decoded only, it means that the prescribed subblock is dequantized and inverse-transformed. Hence, since the prescribed subblock is dequantized and inverse-transformed only, a size of a decoded output image may become a size of the prescribed subblock.

For example, only 4 subblocks in 32×32 transform block can be dequantized and inverse-transformed. In this case, a decoded output image may include a reconstructed block in 16×16 size configured with 4 prescribed subblocks. Hence, since a system need not maintain a memory for the whole 32×32 block, it is efficient in aspects of memory and operation quantity. Yet, an inverse transform process for a prescribed subblock may need to be redesigned.

According to the present invention, only if a transform block size is 16×16 or 32×32, a prescribed block is selected. And, inverse transform of a block unit can be performed on the selected prescribed block only.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A video decoder, comprising;
   a reconstruction signal selector configured to select a signal to be reconstructed for a bitstream;
   an entropy decoder configured to determine a quantization coefficient of at least one block unit by entropy-decoding the selected signal to be reconstructed, wherein entropy-decoding the selected signal comprises decoding a subblock of the selected signal instead of a whole block of the selected signal when at least one coefficient value within the subblock is equal to or greater than a preset reference value, wherein the at least one block unit corresponds to the subblock;
   a dequantizer configured to determine a transform coefficient through dequantization performed on the determined quantization coefficient of the at least one block unit;
   an inverse transformer configured to:
      determine a residual signal through inverse transform using a specific transform base suitable for a block size of the determined transform coefficient, wherein the inverse transform comprises:

performing the inverse transform based on the size of the current transform block if a size of a current transform block is smaller than a first block size; and performing the inverse transform of a second block size less than or equal to the size of the current transform block if the size of the current transform block is greater than the first block size and to perform linear interpolation based on the second block size and the size of the current transform block;

an intra picture predictor configured to determine a predicted signal by referring to reference samples for a current block to be decoded;

a residual signal compensator configured to scale a block of the determined residual signal based on a block size of the predicted signal; and an adder configured to generate a reconstructed signal by adding the scaled residual signal and the predicted signal together.

2. The video decoder of claim 1, wherein the reconstruction signal selector is further configured to select the signal to be reconstructed based on a ratio of an image size of the bitstream to a size of a thumbnail to be created.

3. The video decoder of claim 1, wherein when a number of coefficients within a subblock is equal to or greater than a preset reference value, the entropy decoder is configured to decode the corresponding subblock.

4. The video decoder of claim 1, wherein entropy-decoding the selected signal further comprises substituting the coefficient values of the subblock of the selected signal with a random value instead of decoding the subblock when the at least one coefficient value within the subblock is less than the preset reference value.

5. The video decoder of claim 1, wherein the entropy decoder is further configured to vary a block size of the determined quantization coefficient according to a transform block size of the selected signal to be reconstructed.

6. The video decoder of claim 1, wherein when a location value of a current quantization coefficient is equal to or smaller than a half of a current transform block size, the dequantizer is configured to perform dequantization on a current subblock.

7. The video decoder of claim 6, wherein when the current subblock from among multiple subblocks is a last subblock, the dequantizer is configured to determine a dequantization coefficient for each subblock.

8. The video decoder of claim 1, wherein the residual signal compensator is configured to scale the block of the determined residual signal to be equal to the block size of the predicted signal.

9. The video decoder of claim 1, wherein the adder is further configured to generate the reconstructed signal by a block unit in a manner of adding the predicted signal and the scaled residual signal.

10. A method of decoding a video in a device, comprising;

selecting a signal to be reconstructed for a bitstream;

determining a quantization coefficient of at least one block unit by entropy-decoding the selected signal to be reconstructed, wherein entropy-decoding the selected signal comprises decoding a subblock of the selected signal instead of a whole block of the selected signal when at least one coefficient value within the subblock is equal to or greater than a preset reference value, wherein the at least one block unit corresponds to the subblock;

determine a transform coefficient through dequantization performed on the determined quantization coefficient of the at least one block unit when a preset condition is met, wherein the preset condition relates to at least one of a chroma signal, a size of a transform block, or a location value of a coefficient determine a residual signal through inverse transform using a specific transform base suitable for a block size of the determined transform coefficient, wherein the inverse transform comprises:

performing the inverse transform based on the size of a current transform block if a size of a current transform block is smaller than a first block size;

performing the inverse transform of a second block size less than or equal to the size of the current transform block if the size of the current transform block is greater than the first block size; and performing linear interpolation based on the second block size and the size of the current transform block if the size of the current transform block is greater than the first block size;

outputting a decoded video based on a result from dequantizing the partial block and the determined residual signal.

* * * * *